(12) United States Patent
Renaud

(10) Patent No.: US 9,038,261 B2
(45) Date of Patent: May 26, 2015

(54) FURNITURE ASSEMBLY MODULES

(76) Inventor: Yvon Renaud, Montreal (CA)

( * ) Notice: Subject to any disclaimer, the term of this patent is extended or adjusted under 35 U.S.C. 154(b) by 318 days.

(21) Appl. No.: 13/568,266

(22) Filed: Aug. 7, 2012

(65) Prior Publication Data

US 2013/0036581 A1 Feb. 14, 2013

(51) Int. Cl.
| | |
|---|---|
| *B21D 39/00* | (2006.01) |
| *B25B 5/14* | (2006.01) |
| *B23P 19/10* | (2006.01) |
| *A47B 47/00* | (2006.01) |
| *F16B 12/44* | (2006.01) |

(52) U.S. Cl.
CPC .......... *B25B 5/142* (2013.01); *Y10T 29/49826* (2015.01); *Y10T 24/45984* (2015.01); *Y10T 24/45225* (2015.01); *B23P 19/10* (2013.01); *F16B 12/44* (2013.01); *Y10T 29/49947* (2015.01); *A47B 47/005* (2013.01)

(58) Field of Classification Search
CPC .......... B23P 19/10; B23P 19/12; F16B 12/02; F16B 12/44; F16B 5/0004; F16B 12/00; A47B 47/0033; A47B 47/005; A47B 47/0041; A47B 47/04; A47B 47/045; A47B 47/047; A47B 96/00; B23Q 3/186; Y10T 29/49947
USPC ............... 29/525.01, 464, 267; 312/111, 140; 248/345.1
See application file for complete search history.

(56) References Cited

U.S. PATENT DOCUMENTS

| | | | |
|---|---|---|---|
| 123,708 A | 2/1872 | Kinne | |
| 2,168,911 A | 8/1939 | Meyer | |
| 2,547,112 A | 4/1951 | Daniels | |
| 2,549,509 A | 4/1951 | Munroe | |
| 3,751,127 A * | 8/1973 | Black et al. | 312/111 |
| 3,836,218 A * | 9/1974 | Hallal | 312/111 |
| 3,998,509 A | 12/1976 | Hauser | |
| 4,124,958 A * | 11/1978 | Chiche | 312/140 |
| 4,493,425 A * | 1/1985 | Yoshida | 211/189 |
| 4,618,120 A | 10/1986 | Wattles | |
| 4,637,324 A * | 1/1987 | Janson | 108/187 |
| 6,308,396 B1 * | 10/2001 | Lewis et al. | 29/467 |
| 2004/0131416 A1 * | 7/2004 | Wu et al. | 403/170 |

* cited by examiner

*Primary Examiner* — Jermie Cozart

(57) ABSTRACT

A set of furniture assembly modules adapted to hold members of a piece of furniture together in a preassembled position prior to or during final assembly. The set of furniture assembly modules comprising at least one corner module having a face member and at least two side wall members extending perpendicularly from the face member in the same direction, wherein the face member of the corner module is formed having an L-shape, and at least one intermediate module having a face member and at least three side wall members extending perpendicularly from the face member in the same direction, wherein the face member of the intermediate module is formed having a T-shape, such that a user can incorporate any necessary number of corner and intermediate modules required to hold the piece of furniture together in the preassembled position prior to or during final assembly.

7 Claims, 5 Drawing Sheets

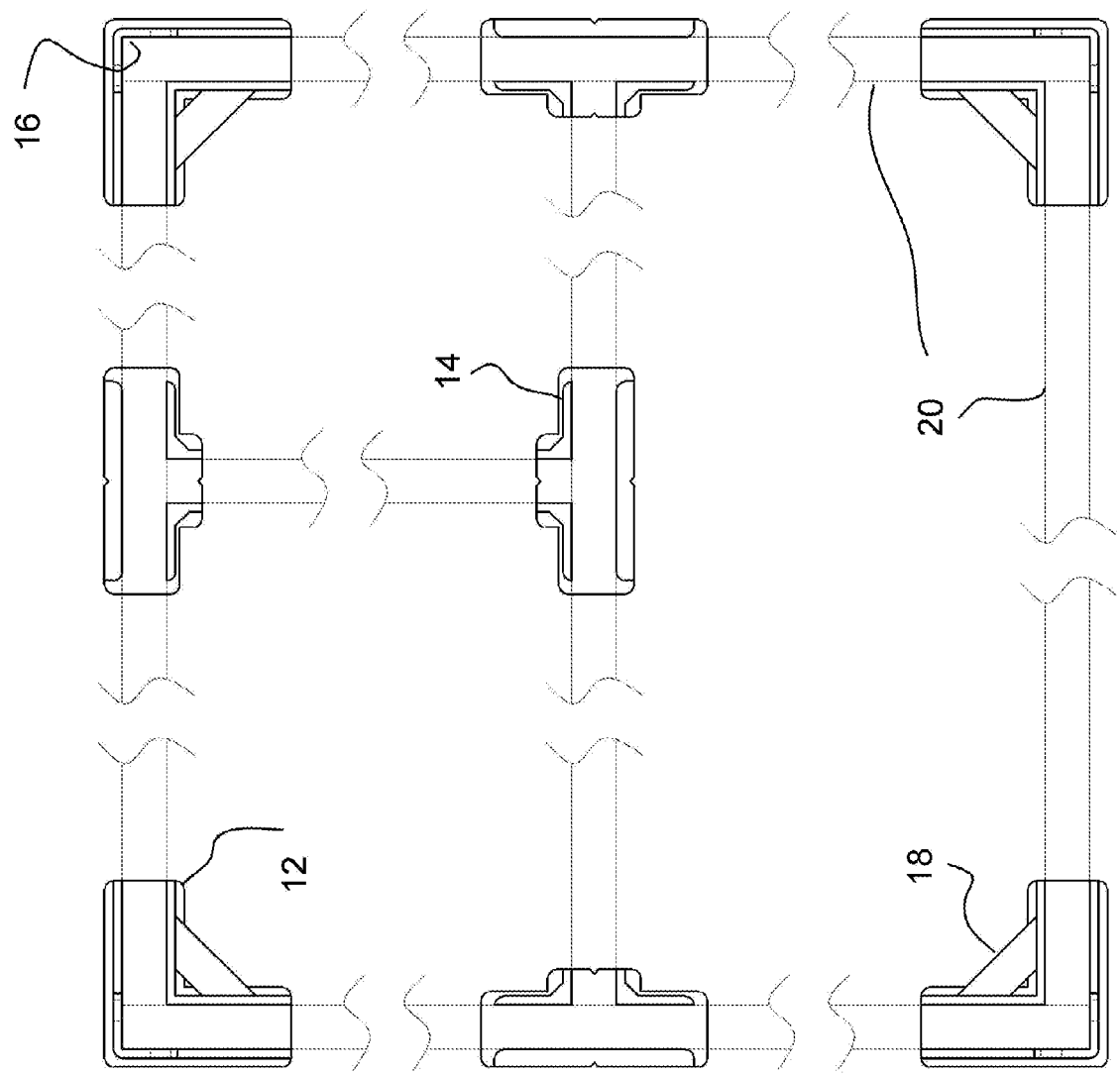

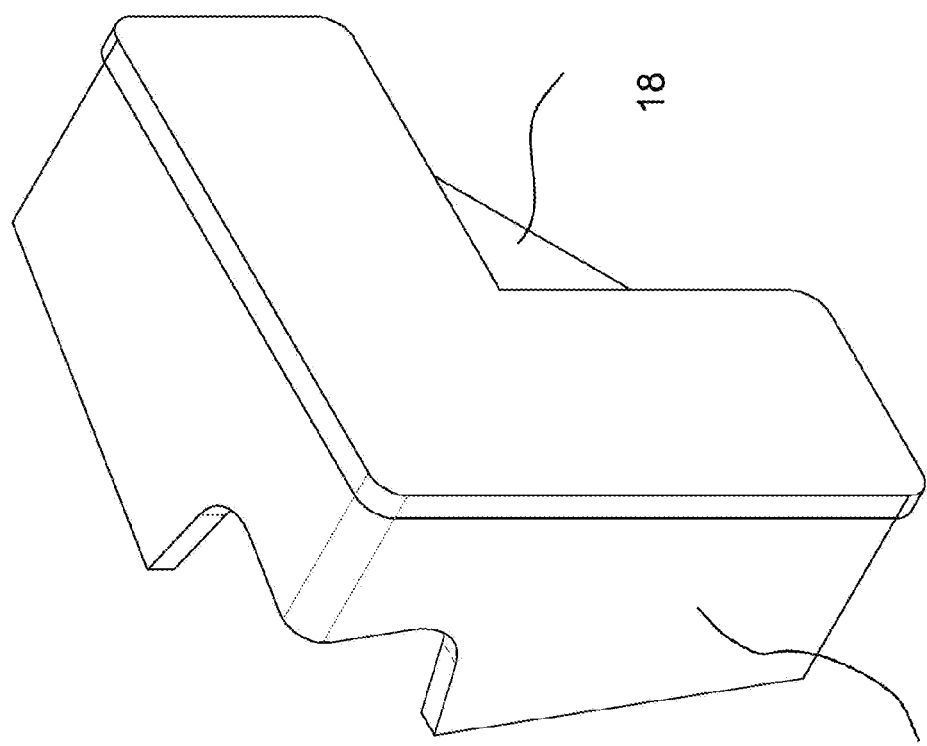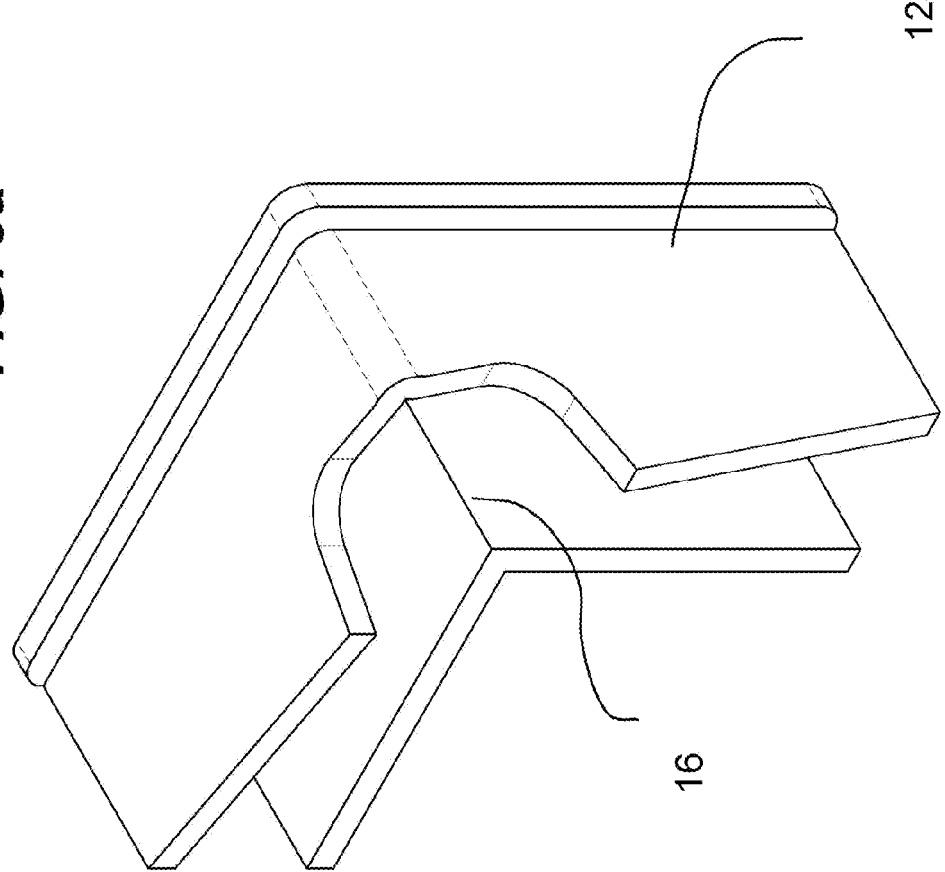

FIG. 4a
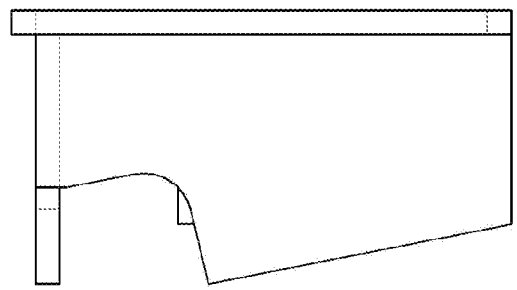
FIG. 4c
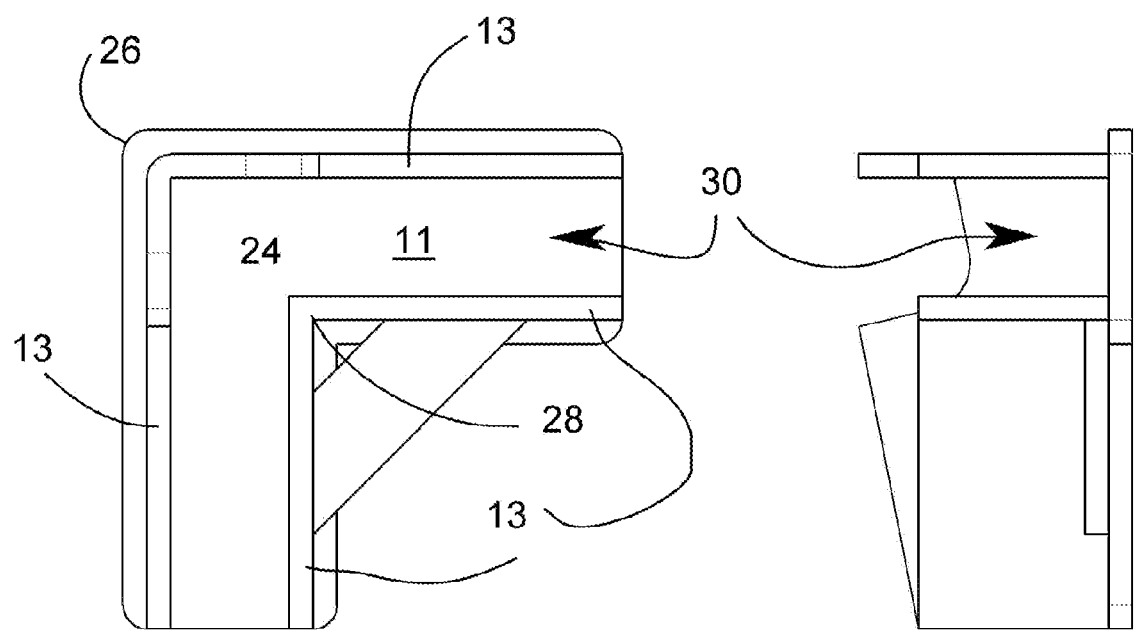
FIG. 4b

FURNITURE ASSEMBLY MODULES

FIELD OF THE INVENTION

The present invention relates generally to furniture making but more particularly to a set of furniture assembly modules.

BACKGROUND OF THE INVENTION

Making furniture for a hobbyist can sometimes be difficult and frustrating, especially when doing it alone. There are a number of clamps and other types of holders designed to hold various parts of a piece of furniture during its assembly process but those systems are usually expensive and not always easy to use.

SUMMARY OF THE INVENTION

In view of the foregoing disadvantages inherent in the known devices now present in the prior art, the present invention, which will be described subsequently in greater detail, is to provide objects and advantages which are:

To provide for a set of simple furniture assembly modules that are easy to use and inexpensive.

In order to do so, the invention consists in a set of furniture assembly modules adapted to hold members of a piece of furniture together in a preassembled position prior to or during final assembly. The set of furniture assembly modules comprising at least one corner module having a face member and at least two side wall members extending perpendicularly from the face member in the same direction, wherein the face member of the corner module is formed having an L-shape, and at least one intermediate module having a face member and at least three side wall members extending perpendicularly from the face member in the same direction, wherein the face member of the intermediate module is formed having a T-shape, such that a user can incorporate any necessary number of corner and intermediate modules required to hold the piece of furniture together in the pre assembled position prior to or during final assembly.

The set of furniture assembly modules has the corner module include four side wall members, two of the side wall members connected at respective adjacent edges at a 90 degree angle to one another, and each connected to an outer edge of the face member, and the other two of the four side wall members also connected at respective adjacent edges at a 90 degree angle to one another, and each connected to an inner edge of the face member, thereby forming an L-shaped channel having two openings and adapted to hold end portions of two pieces of the furniture at a 90 degree angle to one another.

The set of furniture assembly modules has the intermediate module include five side wall members, a first two of the side wall members connected at respective adjacent edges at a 90 degree angle to one another, and each connected to lower side edges of the face member. A second two of the side wall members also connected at respective adjacent edges at a 90 degree angle to one another, and each connected to lower side edge of the face member opposite from the first two side wall members, and the fifth side wall member connected to an upper edge of the face member, thereby forming a T-shaped channel having three openings and adapted to hold an end portion of one piece of the furniture at a 90 degree angle to an intermediate portion of another piece of the furniture.

The set of furniture assembly modules has the corner module further include a reinforcing rib connected to and extending between the other two of the four side wall members that are connected to the inner edge of the face member, to thereby strengthen the corner module.

The set of furniture assembly modules has at least one corner module and at least one intermediate module formed from a material chosen from a list of materials comprising plastic, metal, wood, cardboard, and composite combinations thereof.

The set of furniture assembly modules has at least one corner module and at least one intermediate module formed from injection molded plastic material.

A method of assembling pieces of furniture using a set of furniture assembly modules comprising the steps of:

a) forming the furniture assembly modules having dimensions based upon the dimensions of the furniture pieces, such that the furniture pieces can slide and snugly fit within and between the side wall members of each the corner and intermediate modules.

b) sliding each of the piece of furniture into each respective and appropriate corner module or intermediate module until the pieces of furniture are in a predetermined preassembled configuration.

c) securely connecting the furniture pieces together using predetermined connectors.

d) removing the furniture assembly modules.

The method of assembling pieces of furniture wherein the predetermined connectors are chosen from a group of connectors comprising nails, screws, and glue.

The set of furniture assembly modules hasherein the corner module includes four side wall members; two of the side wall members connected at respective adjacent edges at a 90 degree angle to one another, and each connected to an outer edge of the face member; and the other two of the four side wall members also connected at respective adjacent edges at a 90 degree angle to one another, and each connected to an inner edge of the face member, thereby forming an L-shaped channel having two openings and adapted to hold end portions of two pieces of the furniture at a 90 degree angle to one another.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 1 Plan view of the invention in context of use.
FIGS. 3a-b Isometric views of the corner modules.
FIGS. 4a-c Top and side views of the corner modules.

DETAILED DESCRIPTION OF THE PREFERRED EMBODIMENT

Figure 2B:
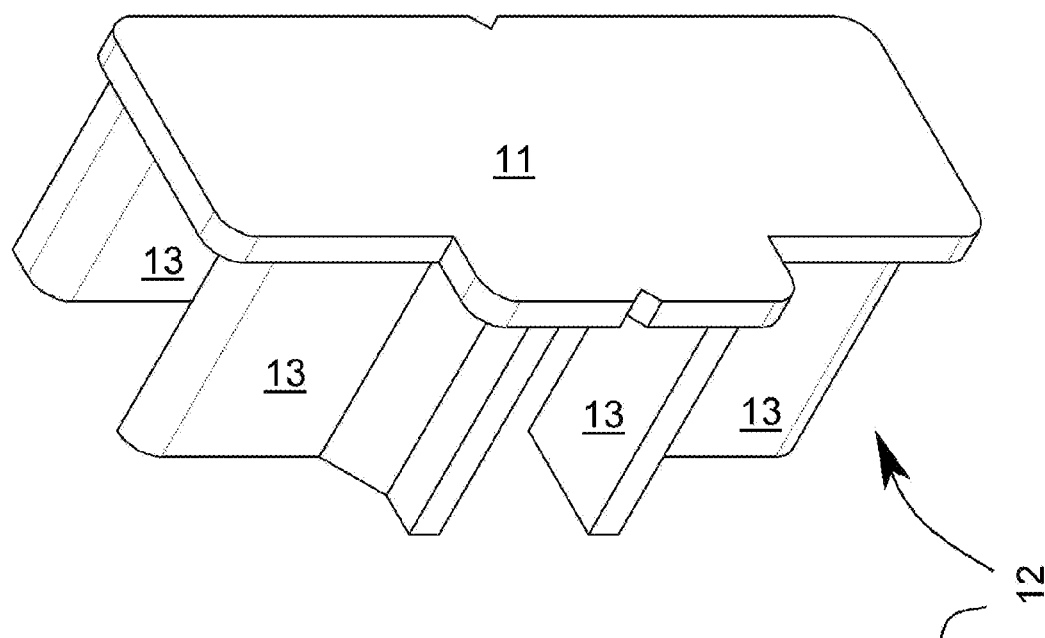
FIGS. 2a-b Isometric views of the intermediate modules.
Figure 2A:
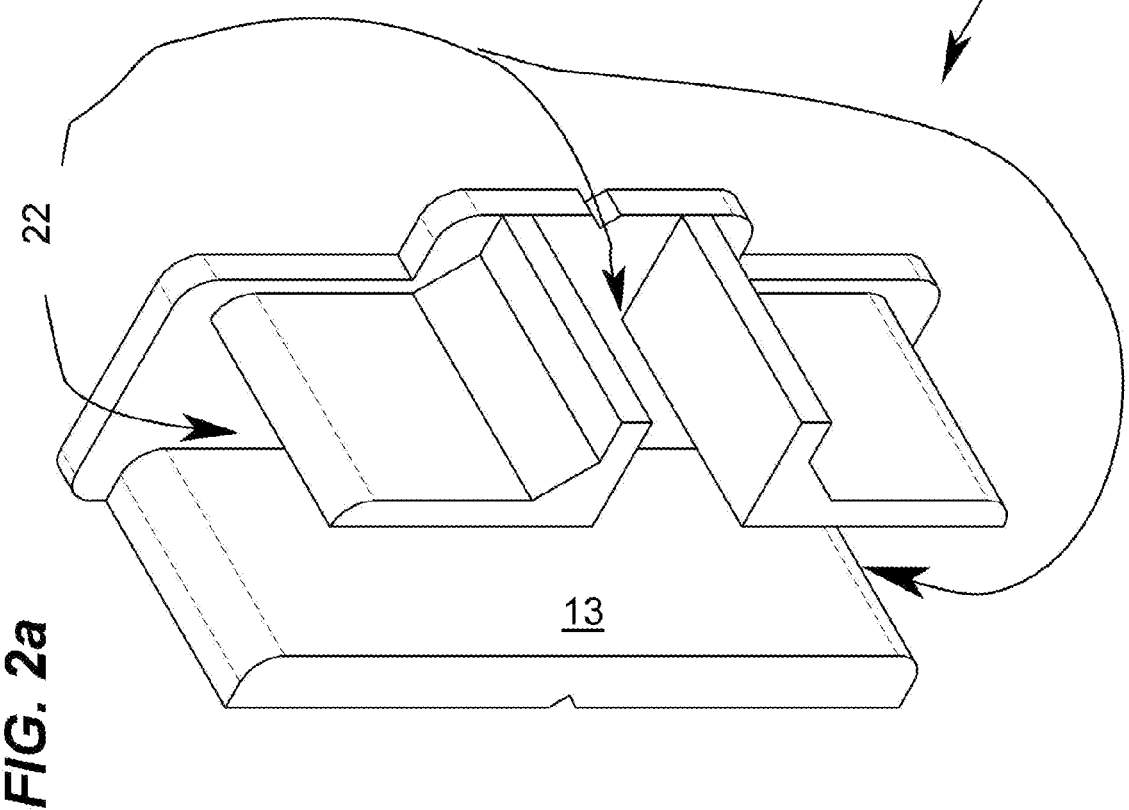
Figure 5A:
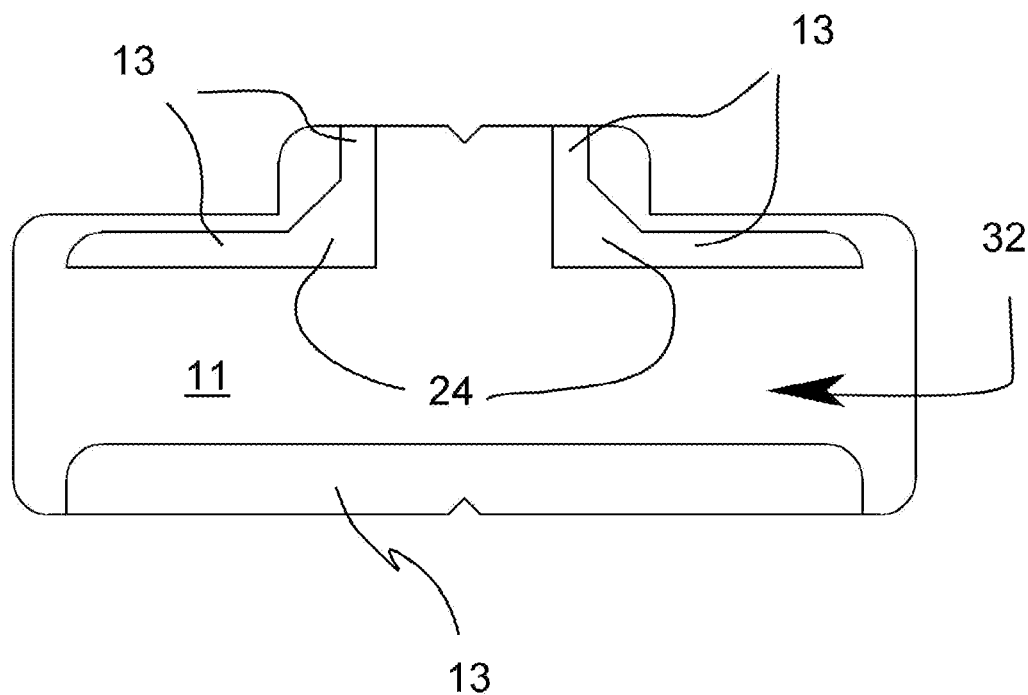
FIGS. 5a-b Top and side views of the intermediate modules.
Figure 5B:
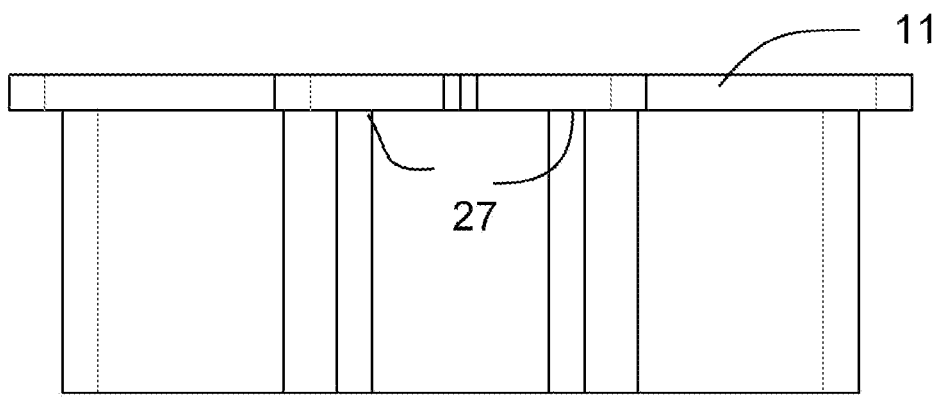

A set of furniture assembly modules (10) consists in corner modules (12) and intermediate modules (14). The corner modules (12) have a 90 degree angle (16) and a reinforcing rib (18) and are generally L-shaped. They are designed for receiving two pieces of furniture (20) that connect at a right angle. The modules (10) have a face member (11) and a plurality of side wall members (13) extending perpendicularly therefrom.

The corner module includes four side wall members (13), two of the side wall members (13) connected at respective adjacent edges (24) at a 90 degree angle to one another, and each connected to an outer edge (26) of the face member (11), and the other two of the four side wall members (13) also connected at respective adjacent edges (24) at a 90 degree angle to one another, and each connected to an inner edge (28) of the face member (11), thereby forming an L-shaped channel (30) having two openings (22) and adapted to hold end portions of two pieces of furniture (20) at a 90 degree angle to one another.

The intermediate modules (14) are T-shaped and have three openings (22) configured and sized to receive up to three pieces of furniture (20), one per opening (22). In some cases, a single piece of furniture (20) can pass through two openings (22).

The intermediate module (14) includes five side wall members (13), a first two of the side wall members (13) connected at respective adjacent edges (24) at a 90 degree angle to one another, and each connected to lower side edges (27) of the face member (11). A second two of the side wall members (13) also connected at respective adjacent edges (24) at a 90 degree angle to one another, and each connected to lower side edge (27) of the face member (11) opposite from the first two side wall members (13), and the fifth side wall member (13) connected to an upper edge (28) of the face member (11), thereby forming a T-shaped channel (32) having three openings (22) and adapted to hold an end portion of one piece of furniture (20) at a 90 degree angle to an intermediate portion of another piece of furniture (20).

Because there are various standard thicknesses in furniture components (20), the furniture assembly modules (10) come in different sizes to accommodate those thicknesses.

The modules (10) can be made up of a variety of materials chosen from a list of materials comprising plastic, metal, wood, cardboard, and composite combinations thereof or formed from injection molded plastic material.

In use, a user simply frictionally inserts by sliding and/or pushing the furniture components (20) into the furniture assembly modules (10) so as to preassemble the furniture prior to or during final assembly, which consists in gluing, nailing or otherwise mechanically fastening the furniture components (20) together. Once the furniture components (20) are finally assembled, the modules (10) are removed, ready to be re used on another project.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, punch dies are the preferred tool used but other types of cutters such as rotary drill cutters could be used and still achieve a similar result.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of assembling pieces of furniture using a set of furniture assembly modules comprising at least one corner module having a face member and at least two side wall members extending perpendicularly from said face member in the same direction, wherein said face member of said corner module is formed having an L-shape; and at least one intermediate module having a face member and at least three side wall members extending perpendicularly from said face member in the same direction, wherein said face member of said intermediate module is formed having a T-shape, such that a user can incorporate any necessary number of corner and intermediate modules required to hold said pieces of furniture together in a preassembled position prior to or during final assembly, and comprising the steps of:

a. forming said furniture assembly modules having dimensions based upon the dimensions of said furniture pieces, such that said furniture pieces can slide and snugly fit within and between side wall members of each corner and intermediate modules;
   b. sliding each piece of furniture into each respective and appropriate corner module or intermediate module until said pieces of furniture are in a predetermined preassembled configuration;
   c. securely connecting said furniture pieces together using predetermined connectors;
   d. removing said furniture assembly modules.

2. The method of assembling pieces of furniture of claim 1, wherein said predetermined connectors are chosen from a group of connectors comprising nails, screws, and glue.

3. The method of assembling pieces of furniture of claim 1, wherein said corner module includes four side wall members; two of said side wall members connected at respective adjacent edges at a 90 degree angle to one another, and said two side wall members connected to an outer edge of said face member;

and the other two of said four side wall members also connected at respective adjacent edges at a 90 degree angle to one another, and said other two side wall members connected to an inner edge of said face member, thereby forming an L-shaped channel having two openings and adapted to hold end portions of two pieces of said furniture at a 90 degree angle to one another.

4. The method of assembling pieces of furniture of claim 1 wherein said intermediate module includes five side wall members; a first two of said side wall members connected at respective adjacent edges at a 90 degree angle to one another; and each connected to lower side edges of said face member; a second two of said side wall members also connected at respective adjacent edges at a 90 degree angle to one another, and each connected to lower side edge of said face member opposite from said first two side wall members, and the fifth side wall member connected to an upper edge of said face member, thereby forming a T-shaped channel having three openings and adapted to hold an end portion of one piece of said furniture at a 90 degree angle to an intermediate portion of another piece of said furniture.

5. The method of assembling pieces of furniture of claim 3, wherein said corner module further includes a reinforcing rib connected to and extending between said other two of said four side wall members that are connected to said inner edge of said face member, to thereby strengthen said corner module.

6. The method of assembling pieces of furniture of claim 1, wherein said at least one corner module and said at least one intermediate module are formed from a material chosen from a list of materials comprising plastic, metal, wood, cardboard, and composite combinations thereof.

7. The method of assembling pieces of furniture of claim 1, wherein said at least one corner module and said at least one intermediate module are formed from injection molded plastic material.

* * * * *